(12) United States Patent
Gayle

(10) Patent No.: US 8,631,050 B1
(45) Date of Patent: Jan. 14, 2014

(54) TRANSFORMATION ENGINE

(71) Applicant: Eliving, LLC, Charlotte, NC (US)

(72) Inventor: Noel G. Gayle, Dacula, GA (US)

(73) Assignee: Eliving, LLC, Charlotte, NC (US)

( * ) Notice: Subject to any disclaimer, the term of this patent is extended or adjusted under 35 U.S.C. 154(b) by 0 days.

(21) Appl. No.: 13/791,546

(22) Filed: Mar. 8, 2013

Related U.S. Application Data

(63) Continuation of application No. 12/813,752, filed on Jun. 11, 2010, now abandoned.

(60) Provisional application No. 61/186,129, filed on Jun. 11, 2009.

(51) Int. Cl.
G06F 17/30 (2006.01)

(52) U.S. Cl.
USPC ........... 707/803; 707/602; 707/604; 707/609; 707/641; 707/654; 707/769; 707/802; 707/804; 707/805; 707/941

(58) Field of Classification Search
USPC ......... 707/602, 604, 609, 641, 654, 769, 802, 707/804, 805, 941
See application file for complete search history.

(56) References Cited

U.S. PATENT DOCUMENTS

| | | | |
|---|---|---|---|
| 5,937,387 A | 8/1999 | Summerell | |
| 5,977,059 A | 11/1999 | Khoo | |
| 5,994,295 A | 11/1999 | Khoo | |
| 6,039,989 A | 3/2000 | Bangs | |
| 6,269,339 B1 | 7/2001 | Silver | |
| 6,397,193 B1 | 5/2002 | Walker | |
| 6,553,386 B1 | 4/2003 | Alabaster | |
| 6,585,516 B1 | 7/2003 | Alabaster | |
| 6,817,863 B2 | 11/2004 | Bisogno | |
| 6,937,599 B1 * | 8/2005 | Yoshida et al. | 370/390 |
| 6,953,342 B2 | 10/2005 | Bisogno | |
| 7,027,871 B2 * | 4/2006 | Burnes et al. | 607/60 |
| 7,090,638 B2 | 8/2006 | Vidgen | |
| 7,159,036 B2 * | 1/2007 | Hinchliffe et al. | 709/242 |
| 7,191,183 B1 * | 3/2007 | Goldstein | 707/602 |
| 7,287,093 B2 * | 10/2007 | Lynch et al. | 709/246 |
| 7,361,143 B2 | 4/2008 | Kirchhoff | |
| 7,386,565 B1 * | 6/2008 | Singh et al. | 1/1 |
| 7,398,464 B1 * | 7/2008 | Wei et al. | 715/239 |
| 7,413,438 B2 | 8/2008 | Bisogno | |
| 7,461,039 B1 * | 12/2008 | Gilman | 706/25 |
| 7,499,769 B2 | 3/2009 | Walker | |
| 7,505,978 B2 * | 3/2009 | Bodin et al. | 1/1 |
| 7,509,477 B2 * | 3/2009 | Suponau et al. | 711/216 |
| 7,523,040 B2 | 4/2009 | Kirchhoff | |
| 7,529,685 B2 | 5/2009 | Davies | |
| 7,584,002 B2 * | 9/2009 | Burnes et al. | 607/59 |
| 7,610,551 B2 * | 10/2009 | Nandiwada et al. | 715/249 |
| 7,634,632 B2 * | 12/2009 | Suponau et al. | 711/216 |

(Continued)

*Primary Examiner* — Frantz Coby
(74) *Attorney, Agent, or Firm* — McGuireWoods LLP

(57) ABSTRACT

A transformation engine is disclosed that retrieves source data from a plurality of disparate data sources and provides source data that is consistent and normalized. the transformation engine comprises a plurality of interfaces that receive source data from a plurality of disparate databases. The source data comprises a plurality of data elements. The transformation engine further comprises a converter that aggregates and converts the received source data so that the plurality of data elements are recognizable as being substantially equivalent; a data processor that formats the received source data by merging and preparing the received source data; and a business rule applicator that filters the received source data.

20 Claims, 6 Drawing Sheets

(56) References Cited

U.S. PATENT DOCUMENTS

| | | | |
|---|---|---|---|
| 7,792,783 B2 * | 9/2010 | Friedlander et al. | 707/600 |
| 7,880,646 B2 * | 2/2011 | Fux et al. | 341/22 |
| 7,949,681 B2 * | 5/2011 | Bodin et al. | 707/795 |
| 8,040,261 B2 * | 10/2011 | Fux et al. | 341/22 |
| 8,086,496 B2 * | 12/2011 | Lu et al. | 705/26.1 |
| 8,117,239 B2 * | 2/2012 | Fields et al. | 707/803 |
| 8,156,134 B2 * | 4/2012 | Sun et al. | 707/763 |
| 2002/0133378 A1 | 9/2002 | Mault | |
| 2003/0140063 A1 | 7/2003 | Pizzorno | |
| 2003/0212579 A1 | 11/2003 | Brown | |
| 2004/0210459 A1 | 10/2004 | Kirchhoff | |
| 2005/0113650 A1 | 5/2005 | Pacione | |
| 2005/0240444 A1 | 10/2005 | Wooten | |
| 2005/0266385 A1 | 12/2005 | Bisogno | |
| 2006/0031094 A1 | 2/2006 | Cohen | |
| 2006/0074279 A1 * | 4/2006 | Brover | 600/300 |
| 2006/0184393 A1 | 8/2006 | Ewin | |
| 2006/0199155 A1 | 9/2006 | Mosher | |
| 2007/0191689 A1 * | 8/2007 | Elitok | 600/300 |
| 2007/0192142 A1 | 8/2007 | Nicholson | |
| 2007/0288266 A1 | 12/2007 | Sysko | |
| 2008/0021288 A1 | 1/2008 | Bowman | |
| 2008/0040151 A1 | 2/2008 | Moore | |
| 2008/0052113 A1 | 2/2008 | Cauley | |
| 2008/0059242 A1 | 3/2008 | Stanford | |
| 2008/0065424 A1 | 3/2008 | Frick | |
| 2008/0086374 A1 * | 4/2008 | Aitken et al. | 705/14 |
| 2008/0091705 A1 * | 4/2008 | McBride et al. | 707/102 |
| 2008/0140713 A1 * | 6/2008 | Utter et al. | 707/104.1 |
| 2008/0162352 A1 | 7/2008 | Gizewski | |
| 2008/0172299 A1 | 7/2008 | Rosenberger | |
| 2008/0177572 A1 | 7/2008 | Fuhrman | |
| 2008/0195594 A1 | 8/2008 | Gerjets | |
| 2008/0201174 A1 | 8/2008 | Ramasubramanian | |
| 2008/0221932 A1 * | 9/2008 | Kane et al. | 705/3 |
| 2008/0275739 A1 | 11/2008 | Frick | |
| 2008/0300917 A1 | 12/2008 | Ryan | |
| 2009/0106313 A1 | 4/2009 | Boldyga | |
| 2010/0076942 A1 * | 3/2010 | Lee | 707/705 |
| 2010/0169109 A1 | 7/2010 | Pelegrin | |
| 2011/0082847 A1 * | 4/2011 | Dodds | 707/705 |
| 2012/0009550 A1 | 1/2012 | Gayle | |

* cited by examiner

| Heart Disease | |
|---|---|
| Data Element | Location |
| Risk Factors | PDR |
| Stage | PDR |
| Linked Conditions | PDR |
| Nutritional Avoidance | USDA |
| Nutritional Assistance | PDR / USDA |
| Drug Interactions | FDA |
| Nutritional and Drug interactions | USDA / FDA |
| Demographics | All |

FIG. 2

| Client Input | | Wellness | | Ingredients | | | Nutrients | |
|---|---|---|---|---|---|---|---|---|
| | | Encourage | Avoid | Encourage | Limit | Avoid | Encourage | Avoid |
| Height | 5'9" | | | | | | | |
| Weight | 240 | | | | | | | |
| Gender | male | | | | | | | |
| Race | Caucasian | | | | | | | |
| Condition | Heart Disease | stage 2 priority | | lfy drk grn | | sodium | | |
| | Stage 2 | 15 min per day | Hvy activity | | | | | |
| | Diabetes | 15 min per day | | | protein, sugar | potassium | | |
| Medications | Lipitor | | | | | | | |
| | Insulin N | | | | sugar | | | |
| | Zocor | | | | | Grapefruit | | |
| Allergies | Peanuts | | | | | vg oil, pea, etc | | |
| Goals | Healthy eating | 2/3 protein | | | | | | Vit C |
| | Weight Loss | 1700 calories | | | carbohydrates | | | |

FIG. 3

TRANSFORMATION ENGINE

CROSS REFERENCE TO PRIOR APPLICATIONS

This application is a continuation of U.S. patent application Ser. No. 12/813,752, filed Jun. 11, 2010, titled "TRANSFORMATION ENGINE," which claims the benefit of provisional U.S. Patent Application No. 61/186,129, filed on Jun. 11, 2009, and titled "METHOD AND SYSTEM FOR PROVIDING NUTRITIONAL PRODUCTS," both of which are hereby incorporated herein by reference in their entireties. This application is related to U.S. patent application Ser. No. 12/782,441, filed on May 18, 2010, titled "METHOD AND SYSTEM FOR PROVIDING NUTRITIONAL PRODUCTS," and U.S. patent application Ser. No. 13/153,658, filed on Jun. 6, 2011 titled "PERSONAL WELLBEING :DEVICE AND SYSTEM."

FIELD OF THE DISCLOSURE

The present disclosure relates to a method, a system and a computer program for aggregating and processing source data from disparate data sources and providing a normalized data set for determining user criteria.

BACKGROUND OF THE DISCLOSURE

The amount of wellness-related data available today is vast and unstructured. For example, in environments such as the Food and Drug Administration (FDA), United States Department of Agriculture (USDA), or the National Institute of Health (NIH), wellness-related data is available in an unstructured, uncorrelated and/or incomplete form. Additionally, numerous commercial applications exist that provide wellness-related data that is incomplete because of commercial proprietary concerns.

The present disclosure provides a method, a system and a computer program for retrieving source data, which includes wellness-related data, from disparate data sources and consolidating, aggregating, and processing the retrieved source data to provide a unique data set for determining user criteria.

SUMMARY OF THE DISCLOSURE

A method, a system and a computer program are provided for accessing and retrieving source data from disparate data sources, and then consolidating, aggregating, and processing the retrieved source data to provide a unique data set for determining user criteria.

According to an aspect of the disclosure, a transformation engine is disclosed that retrieves source data from a plurality of disparate data sources and provides source data that is consistent and normalized. The transformation engine comprises: a plurality of interfaces that receive source data from a plurality of disparate databases, the source data comprising a plurality of data elements; a converter that aggregates and converts the received source data so that the plurality of data elements are recognizable as being substantially equivalent; a data processor that formats the received source data by merging and preparing the received source data; and a business rule applicator that filters the received source data. The data processor may be configured to receive a first source data and a second source data and format the first source data or the second source data in accordance with an input format of the business rule applicator. The plurality of interfaces may comprise at least one of an application program interface, an open database connectivity, and an input-output-interface. The application program interface may access at least one of: a USDA database; an FDA database; a PDR database; an ADA database; an MDM database; an IM database; an RDA/RDI database; a REF database; and an RMMS database. The business rule applicator may be configured to filter the received source data based on input requirements of at least one of: a nutrient caloric intake processor; a drug interaction processor; and a nutrient impact processor.

The transformation engine may further comprise a normalizer that analyzes a first source data and a second source data in the received source data and formats the first source data or the second source data so that a quantity of a first data element in the plurality of data elements is determined to be substantially equivalent to a quantity of a second data element.

The transformation engine may be included in a condition engine.

According to a further aspect of the disclosure, a method is disclosed for transforming source data received from a plurality of disparate data sources to source data that is consistent, mapped and correlated. The method comprises: receiving, at a plurality of interfaces, the source data from the plurality of disparate data sources, the source data comprising a first data element and a second data element; aggregating and converting the received source data from the plurality of disparate data source so that the first data element and the second data element are recognizable as being substantially equivalent; parsing the aggregated and converted source data; categorizing the parsed source data; and applying a business rule to the categorized source data to output a filtered source data. The parsing of the aggregated and converted source data and the categorizing of the parsed source data may be performed in accordance with an input format of a business rule applicator.

The method may further comprise: analyzing the received source data; and formatting the received source data so that a quantity of the first data element is determined to be substantially equivalent to a quantity of a third data element.

The method may further comprise filtering the received source data based on input requirements of at least one of: a nutrient caloric intake processor; a drug interaction processor; and a nutrient impact processor.

According to a still further aspect of the disclosure, a transformation engine is disclosed. The transformation engine comprises: a plurality of interfaces, each of which is configured to receive source data from at least one of a plurality of disparate databases; a converter configured to aggregate and convert source data received from the plurality of disparate databases so that a first data element and a second data element are recognizable as being substantially equivalent, the received source data comprising the first data element and the second data element; a data processor configured to merge and prepare the received source data; and a business rule applicator configured to filter the source data. The data processor may be further configured to receive the source data and format the source data in accordance with an input format of the business rule applicator. The plurality of interfaces may comprise at least one of an application program interface, an open database connectivity, and an input-output-interface. The application program interface may be configured to access at least one of: a USDA database; an FDA database; a PDR database; an ADA database; an MDM database; an IM database; an RDA/RDI database; a REF database; and an RMMS database.

The transformation engine may further comprise a normalizer configured to analyze and format a quantity of the first data element and a quantity of a third data element as being substantially equivalent;

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the detailed description serve to explain the principles of the disclosure. No attempt is made to show structural details of the disclosure in more detail than may be necessary for a fundamental understanding of the disclosure and the various ways in which it may be practiced. In the drawings.

FIG. 2 shows an example of medical criteria that may be used to process source data towards generating or updating a user profile;

FIG. 3 shows an example of a user profile;

Figure 1:
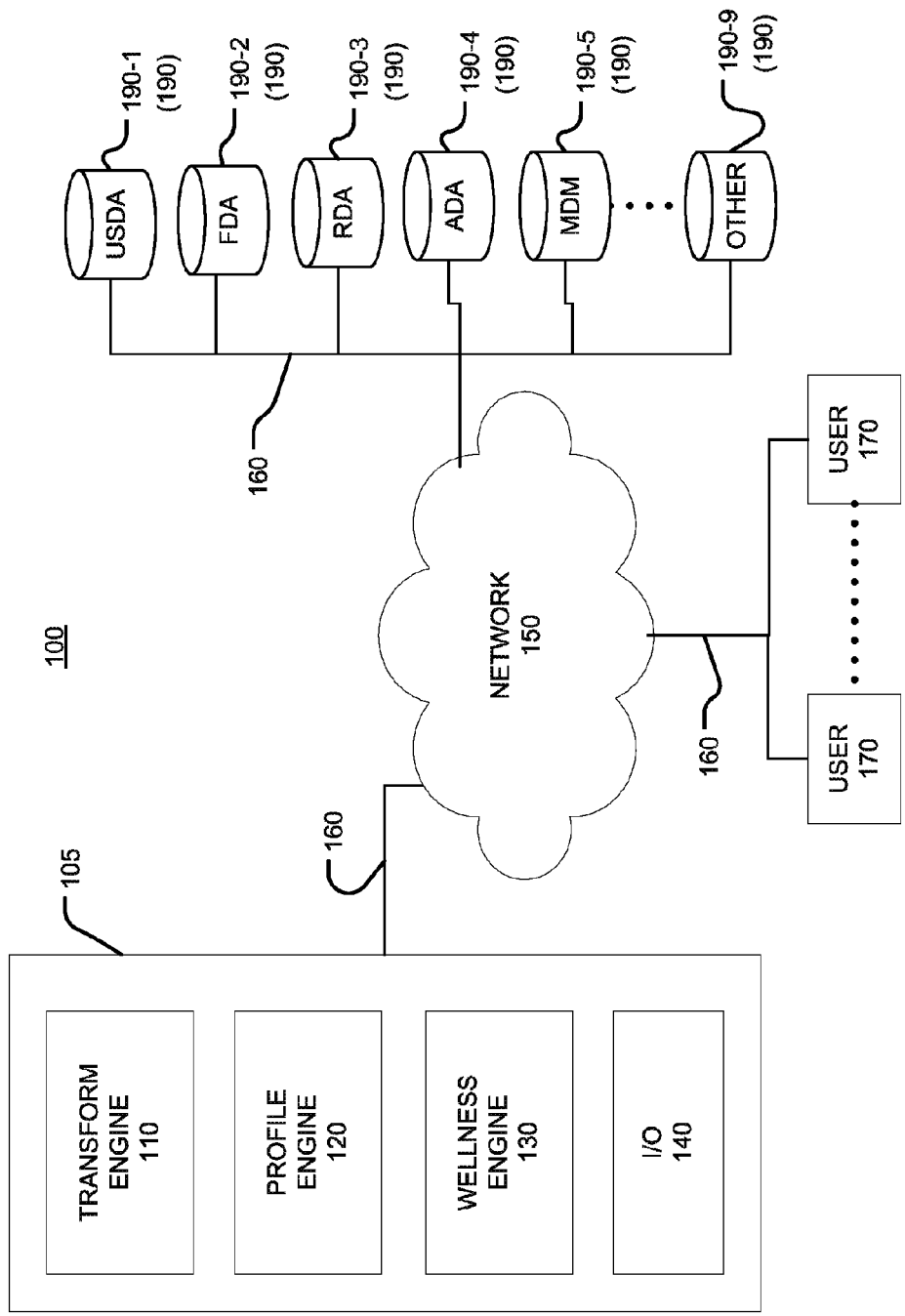
FIG. 1 shows an example of a conditional system.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like. Further, the computer may include an electronic device configured to communicate over a communication link. the electronic device may include, for example, but is not limited to, a mobile telephone, a personal data assistant (PDA), a mobile computer, a stationary computer, a smart phone, mobile station, user equipment, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "network," as used in this disclosure, means an arrangement of two or more communication links. A network may include, for example, the Internet, a local area network (LAN), a wide area network (WAN), a metropolitan area network (MAN), a personal area network (PAN), a campus area network, a corporate area network, a global area network (GAN), a broadband area network (BAN), any combination of the foregoing, or the like. The network may be configured to communicate data via a wireless and/or a wired communication medium. The network may include any one or more of the following topologies, including, for example, a point-to-point topology, a bus topology, a linear bus topology, a distributed bus topology, a star topology, an extended star topology, a distributed star topology, a ring topology, a mesh topology, a tree topology, or the like.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, or the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, to FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

FIG. 1 shows an example of a Conditional System (CS) 100, according to principles of the disclosure. The CS 100 includes a Conditional Engine (CE) 105, a network 150, one or more users 170 and one or more data sources 190. The CE 105, users 170 and data sources 190 may be connected to the network 150 through a plurality of communication links 160. Each of the CE 105, users 170 and data sources 190 may include a computer.

The data sources 190 may include disparate data sources such as, for example, United States Department of Agriculture (USDA) databases 190-1, U.S. Food and Drug Administration (FDA) databases 190-2, Recommended Dietary Allowance (RDA) databases 190-3, American Dietetic Association (ADA) data 190-4, Morrison Diet Manual (MDM) databases 190-5, Institutes of Medicine (IM) 190-6 (shown in FIG. 5), Reference (or Recommended) Daily Intake (RDI) databases 190-7 (shown in FIG. 5), National Institutes of Health (NIH) databases 190-8, (shown in FIG. 5), and/or other government (or non-government) data sources 190-9. + The data sources 190 may further include, for example, REF databases (not shown), and recipe and menu management system (RMMS) databases (not shown).

The CE 105 includes a Transformation Engine (TE) 110, a Profile Engine (PE) 120, a Wellness Engine (WE) 130 and an input/output (I/O) interface 140. The I/O interface 140 is configured to provide communication between the CE 105, including the TE 110, the PE 120 and the WE 130, and the outside world, including the users 170 and data sources 190, through the network 150. The CE 105 collects unique user information for each of the users 170. The users 170 may provide the user information by means of, for example, a smart device, such as, for example, the smart device described in co-pending U.S. patent application Ser. No. 61/363,468, filed on Jul. 12, 2010. The user information for a particular user 170 may include, for example, the user's height, the user's gender, the user's date of birth (DOB), the user's family history, the user's race, the user's weight, the user's goals and food history, the user's lifestyle criteria, the drug or medications taken by the user, the dosage(s) of the drug or medications taken, the food supplements and herbs consumed by the user, the user's medical condition(s), the user's allergies, and the like.

The TE 110 may include, for example, one or more application program interfaces (APIs), open database connectivity (ODBC), or other transport mechanisms, as understood by those having ordinary skill in the art. The TE 110 is configured to access the one or more data sources 190 and retrieve source data from the data sources 190. The TE 110 is further configured to consolidate, aggregate, and process the retrieved source data to provide a unique data set for determining user criteria. Specifically, on the basis of the user information provided by the users 170, the TE 110 converts and normalizes the source data. The source data may include, for example, food and nutrition data, food supplements data, herbs data, dietary health data, demographic data, over-the-counter (OTC) drug data, prescription data, medical condition data, allergy data, lifestyle data (for example, smoking, alcoholic intake, exercise activity, sleeping patterns, or the like), or the like, and any related research, guidelines, discussions, publications, blogs, laws, rules, or the like, related to the foregoing types of data. The TE 110 is configured to convert and normalize the source data into user criteria, which may include, for example, normlized, formatted data, guidelines, and thresholds established for managing specific factors associated with demographics, drugs, medical conditions, allergies, or the like.

FIG. 2 shows an example of user criteria 1100 that may be determined for a particular medical condition. In this example, the user criteria 1100 includes data related to established medical criteria for heart disease, including, for example: risk factor data 1110 that includes risk factors related to heart disease; stage data 1120 that includes the venous stages of heart disease; linked condition data 1130 that includes the various conditions that may be linked to heart disease; nutritional avoidance data 1140 that includes various nutrients that are found to reduce the likelihood of heart disease; nutritional assistance data 1150 that includes various nutrients that are found to increase the likelihood of heart disease; drug interaction data 1160 that includes interactions between the various types of drugs that may be used to treat heart disease, as well as OTC drugs and other prescription drugs; nutritional and drug interaction data 1170 that includes interactions between various nutrients and drugs; demographic data 1180 that includes various demographics related to heart disease; and the like. It is noted that the user criteria 1100 may include data related to other medical conditions, demographic information, or the like. The TE 110 is configured to access and retrieve the plurality of data elements 1110 through 1180 from the data sources 190, as seen in FIG. 2.

The PE 120 is configured to receive the user criteria from the TE 110 and analyze the user information provided by the users 170 with regard to the user criteria to determine a unique user profile for each user 170. Each user profile may be based on, for example, input selections provided during an initial user information capture session. The user profile for each user 170 may be updated as the associated user information changes over time. The user profile may be supplied from the PE 120 to the WE 130.

The PE 120 may interact with each user 170 to capture the user information from each user 170. The captured user information may then be used to generate (or update) the user profile for each user 170. The PE 120 may provide a profile analysis to each user 70 across a wide spectrum of product and/or service offerings from both internal and/or external environments that match the user information. In this regard, the PE 120 may, for example, compare and match the unique medical condition of a user 170 with the specified factors associated with the medical condition. The PE 120 may then tag specific drugs, nutrients, ingredients, programs, and the like, which should be avoided or encouraged depending on the user information of the user 170, with a code. The PE 120 may output the resultant profile analysis data in the form of the user profile to the WE 130 and/or the user 170. The user profile may include a unique user identifier for interaction with the CE 105. The user profile may include hundreds, or more (or less), demographic and tagged items derived from the user information provided by the users 170.

The WE 130 is configured to receive and analyze the ingredient profile and filter product and/or service offerings to fit the user information for each user 170. The resultant, filtered conditional based products and/or services, which may span across the wellness and nutrition spectra, including, for example, a meal plan, a diet plan, a recipe, a nutritional conflict, an exercise routine, or the like, may be provided to the users 170. The product and/or service offerings may include, for example, a recipe, a diet plan, a menu plan, a prepared meal (for example, from art internal and/or external partner), exercise programs (or plans), exercise equipment, and the like. The WE 130 may provide a culmination of a detailed conditional analysis that may tailor substantially all products and/or services offered to each user 170 in the CS 100.

A computer readable medium (not shown) may be provided that includes a computer program, which when executed by a computer may cause each of the processes performed in the CE 105 (shown in FIG. 1) to be carried out according to the principles of the disclosure. The computer readable medium may include an instruction (for example, code section or code segment) corresponding to each of the processes.

FIG. 3 shows an example of a user profile 1300, according to principles of the disclosure. The user profile 1300 includes, for example, client input data 1301, wellness data 1302, ingredients data 1303, and nutrients data 1304. Each of the wellness data 1302, ingredients data 1303 and nutrients data 1304 may include, for example, two types of data, including encourage data and avoid data. The encourage data may include an article or an activity that is to be encouraged or recommended for the particular user 170 associated with the user profile 1300. The avoid data may include an article or an activity that is to be discouraged or avoided for the particular user 170 associated with the user profile 1300. The client input data 1301 may include, for example, height data 1305, weight data 1310, gender data 1315, race data 1320, medical condition data 1325-1335, medications or drug data 1340-1350, allergy data 1355, goal data 1360-1365, and the like. The user profile 1300 may include hundreds, or more (or less), of demographic and tagged items derived from the user information.

Figure 4:
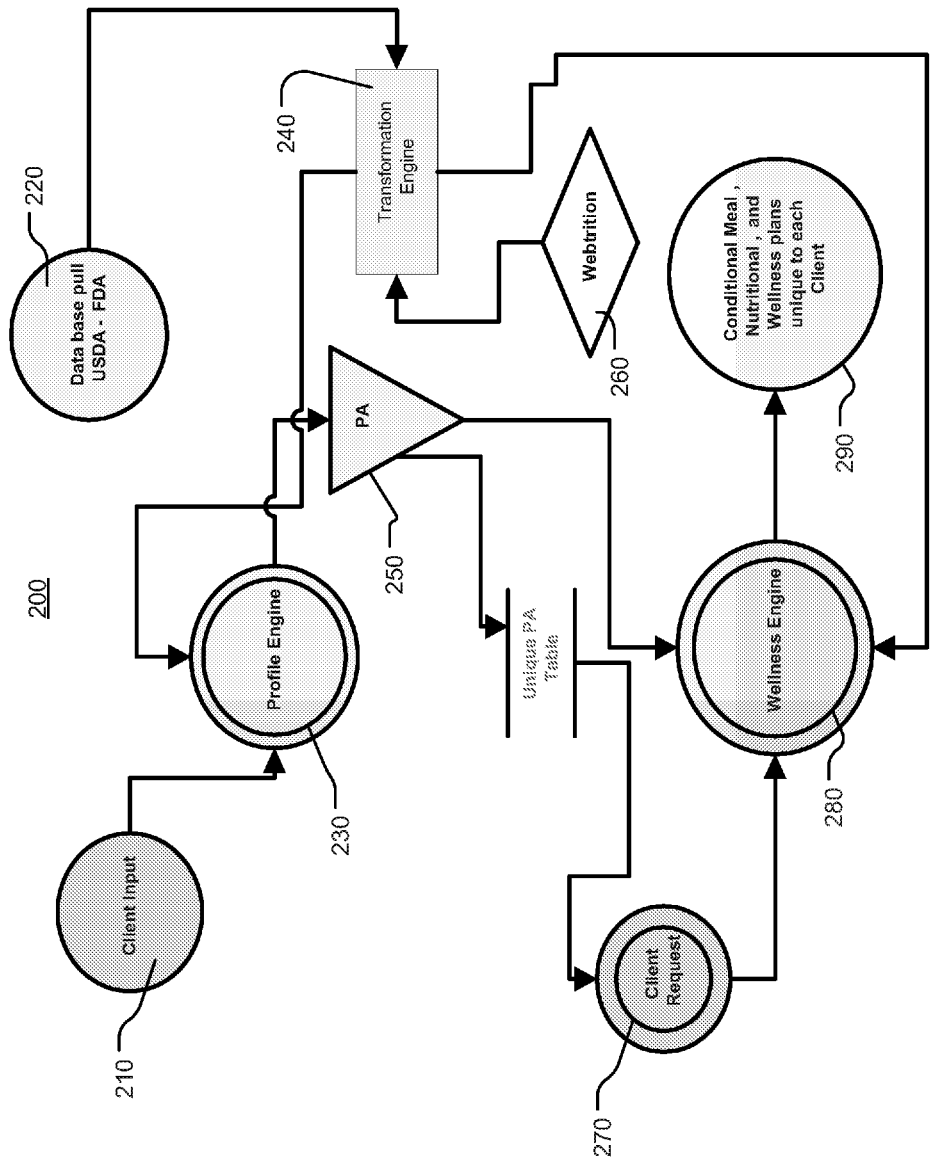
FIG. 4 shows an example of a process for generating and outputting a host of custom-tailored recipes, meal plans, programs, analytics, and the like, to each user.

FIG. 4 shows an example of a process 200 that may be carried out by the CE 105 (shown in FIG. 1). Referring to FIGS. 1 and 4, the PE 120 may interact with each user 170 (Step 210) to capture specific user information, such as, for example, but not limited to, all conditions, medications, and the like, for each user 170 (Step 230). The PE 120 may also interact with the TE 110 to receive user criteria (for example, medical criteria 1100, shown in FIG. 2) (Step 240), which is based on source data received from the databases 190 (Step 220). The TE 110 may also receive source data from an RMMS database (not shown), which may include, for example, the Webtrition™ (Step 260). The PE 120 may then provide a user profile (for example, user profile 1300, shown in FIG. 3), which may be applied across a wide spectrum of product and/or service offerings from both internal and/or external environments (Step 250). The PE 120 may compare and match the user information to the user criteria. The PE 120 may then tag specific nutrients, ingredients, programs, and the like, with a code that should be avoided or encouraged depending on the user information associated with the respective user 170. The PE 120 may output the resultant user profile to the WE 130 (Step 280) and/or the user 170 (Step 270). The user profile may include a unique user identifier for interaction with the CE 105. The user profile may include hundreds, or more (or less), demographic and tagged items derived from the user information.

The WE 130 receives the user profile and filters product and/or service offerings to fit the user information of the user 170 (Step 290). The product and/or service offerings may include, for example, a recipe, a diet plan, a menu plan, a prepared meal (for example, from an internal and/or external partner), exercise programs (or plans), exercise equipment, and the like.

All three components, including the TE 110, the PE 120 and the WE 130 make up the CE 105. The CE 105 provides a tailored approach to wellness, nutrition, and diet for each user 170. The CE 105 may be used in the contract food services (such as, for example, health care, assisted living communities, or the like), or the like.

According to a further aspect of the disclosure, a computer program may be provided embodied in a computer readable medium, which when executed on a computer in the CE 105 (or TE 110, or PE 120, or WE 130) may cause Steps 210 through 290 of the process 200 to be carried out. The computer readable medium may include a code section (or segment) associated with each of the Steps 210 through 290.

Figure 5:
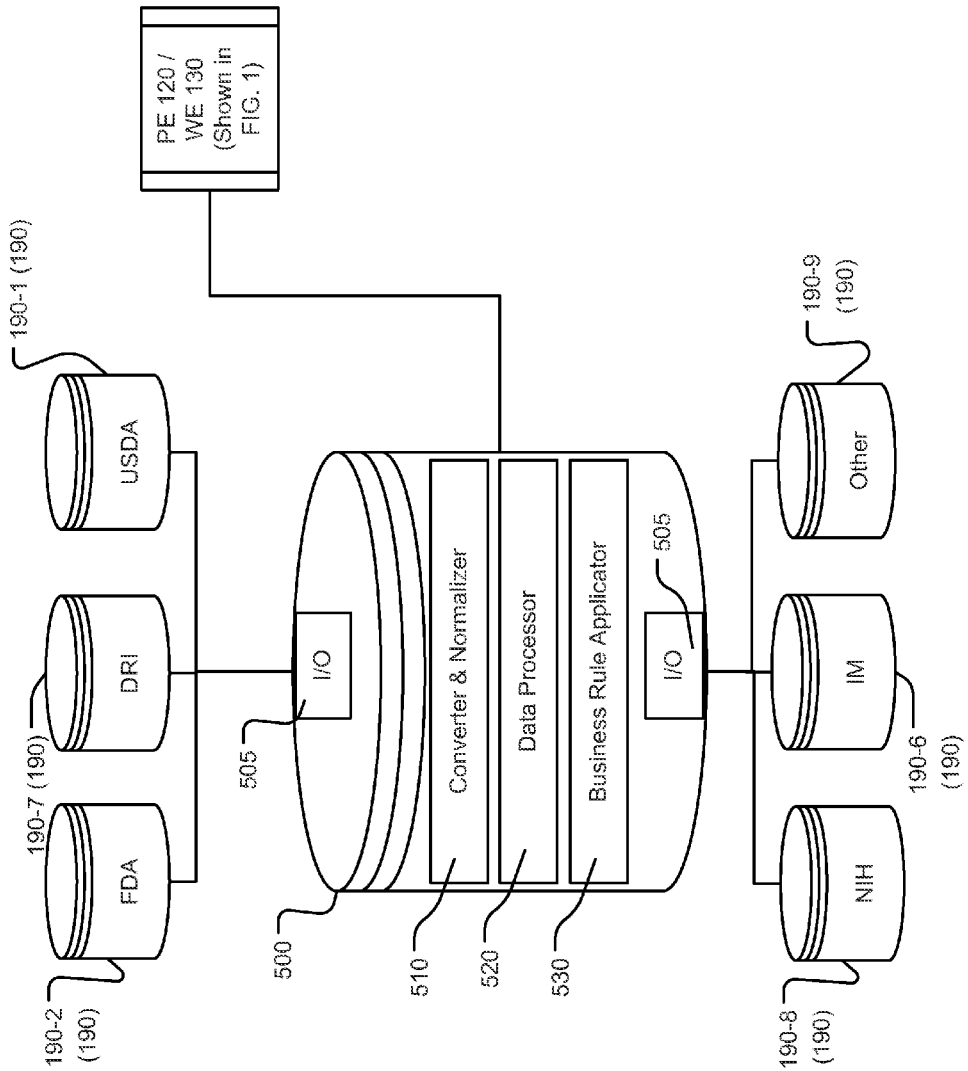
FIG. 5 shows an example of a transformation engine.

FIG. 5 shows an example of a transformation engine (TE) 500, according to principles of the disclosure. The TE 500 includes one or more input-output (I/O) interface units 505, a converter-normalizer 510, a data processor 520, and a business rules applicator 530. The transformation engine 500 also includes a computer (not shown). The transformation engine 500 may include a database (not shown) and/or a server (not shown). The TE 500 is configured to access source data in the disparate data sources 190 and retrieve information therefrom related, but not limited to, for example, foods, nutrition, drugs, herbs, supplements, diseases, medical conditions, genetics, allergies, gender, race, ethnicity, nationality, age, height, weight, percentage body fat, exercise programs, lifestyles, occupations, education, and the like. The TE 500 may apply one or more business rules to the retrieved source data, after it has been converted, normalized and processed, to provide filtered source data that may be used in the CS 100 to determine nutrient-caloric intake, drug interactions, nutrient impacts, food-nutrient-drug interaction, food-nutrient-allergy interaction, and the like, for individual or groups of users.

The I/O units 505 may include, for example, one or more application programming interfaces (API's), an open database connectivity (ODBC), or other transport mechanisms, as understood by those having ordinary skill in the art, which are configured to access and retrieve data from various disparate data sources, including the one or more data sources 190. The I/O units 505 are configured to provide communication between the Transformation engine 500 and the plurality of disparate data sources 190. The I/O units 505 include an interface (not shown) associated with each unique data source 190 to be accessed, wherein each interface is configured to access the associated data source 190 and retrieve relevant source data from the data source 190. In this regard, the I/O units 505 may use available API's to access the data sources 190 and, where API's are not available, the I/O units 505 may use an ODBC or other transport mechanism to access the data sources 190.

The converter-normalizer 510 is configured to access and capture source data (via the I/O units 505) in a consistent form from the different data sources 190. The converter-normalizer 510 may capture source data related, but not limited to, for example, foods, nutrition, drugs, herbs, supplements, diseases, medical conditions, genetics, allergies, gender, race, ethnicity, nationality, age, height, weight, percentage body fat, exercise programs, lifestyles, occupations, education, and the like. The converter-normalizer 510 may apply one or more conversion algorithms to the source data received from the data sources 190 to ensure that the transformed data fits a predetermined application model. A function of the conversion algorithms is to make the data consistent. For instance, source data from RDA database(s) 190-3 may provide a caloric intake given a certain range (for example, height range, weight range, age range, or the like), and the FDA database(s) 190-2 may provide total amounts of intake given a certain drug. The converter-normalizer 510 may analyze both sets of source data and format the source data in a manner that the application model may recognize the two elements as being substantially equivalent.

The application model or profile may include the desired end state output of the CE 105. The application model establishes the thresholds that the various data elements will be measured against. Since the source data from the various data sources 190 will have been made consistent and normalized, the CE 105 may establish specific boundaries for conditions created or provided by a user.

For example, the data received from the DRI 190-7 may be provided in micrograms (μg) and the data received from the USDA 190-1 may be provided in international units (IU) (for example, N IU=X μg, where N is a positive real number and X is a positive real number for a mass of the particular element or compound corresponding to the quantity N of IUs for the element or compound). The converter-normalizer 510 may analyze both sets of source data from the DRI 190-7 and USDA 190-1 and format the source data and provide the formatted data in IU's or μg's.

The converter-normalizer 510 may also apply one or more normalization algorithms to ensure source data consistency through the process. For instance, the source data received from the USDA database(s) 190-1 may provide an ingredient or nutrient quantity and spell the name of the ingredient (for example, "Vitamin D") or nutrient quantities differently than, for example, the source data provided by the RDA database(s) 190-3 for the same ingredient (for example, "Vit. D") or nutrient quantities. The converter-normalizer 510 may analyze both sets of source data and format the data in a manner that the application model may recognize the ingredient (for example, "Vitamin D") or nutrient quantities as being substantially equivalent.

For example, the converter-normalizer 510 may access the Council for Responsible Nutrition database, which provides the dietary reference intakes (DRI) and upper limits (UL) for vitamin and mineral recommendations shown below in Table 1. The converter-normalizer 510 may also access the NIH database, which provides the selected food sources of Vitamin D shown below in Table 2.

TABLE 1

| VITAMIN/MINERAL | DRI | UL |
|---|---|---|
| Vitamin A | 900 mcg (3000 IU) | 3000 mcg (10,000 IU) |
| Vitamin C | 90 mg | 2000 mg |
| Vitamin D | 15 mcg (600 IU) | 50 mcg (2000 IU) |
| Vitamin E | 15 mg | 1000 mg |
| Vitamin K | 120 mcg | Not Determined |
| Thiamin | 1.2 mg | Not Determined |
| Riboflavin | 1.3 mg | Not Determined |
| Niacin | 16 mg | 35 mg |
| Vitamin B-6 | 1.7 mg | 100 mg |
| Folate | 400 mcg (food) 200 mcg (synthetic) | 1000 mcg synthetic |
| Vitamin B-12 | 2.4 mcg | Not Determined |
| Biotin | 30 mcg | Not Determined |
| Pantothenic acid | 5 mg | Not Determined |
| Choline | 550 mg | 3500 mg |

TABLE 2

| FOOD | IUs per Serving | Percent DV |
|---|---|---|
| Cod liver oil, 1 table spoon | 1,360 | 340 |
| Salmon (sockeye), cooked, 3 ounces | 794 | 199 |
| Mushrooms that have been exposed to ultraviolet light to increase vitamin D, 3 ounces (not yet commonly available) | 400 | 100 |
| Mackerel, cooked, 3 ounces | 388 | 97 |
| Tuna fish, canned in water, drained, 3 ounces | 154 | 39 |
| Milk, nonfat, reduced fat, and whole, vitamin D-fortified, 1 cup | 115~124 | 29~31 |
| Orange juice fortified with vitamin D, 1 cup (check product labels, as amount of added vitamin D varies) | 100 | 25 |
| Yogurt, fortified with 20% of the DV for vitamin D, 6 ounces (more heavily fortified yogurts provide more of the DV) | 80 | 20 |
| Margarine, fortified, 1 tablespoon | 60 | 15 |

TABLE 2-continued

| FOOD | IUs per Serving | Percent DV |
|---|---|---|
| Sardines, canned in oil, drained, 2 sardines | 46 | 12 |
| Liver, beef, cooked, 3.5 ounces | 46 | 12 |
| Ready-to-eat cereal, fortified with 10% of the DV for vitamin D, 0.75-1 cup (more heavily fortified cereals might provide more of the DV) | 40 | 10 |
| Egg, 1 whole (vitamin D is found in yolk) | 25 | 6 |
| Cheee, Swiss, 1 ounce | 6 | 2 |

On the basis of the source data in Table 1 and Table II, the converter-normalizer 510 may analyze both sets of data and format the source data in a manner that the application model recognizes Vitamin D and, for example, Cod liver oil as being substantially equivalent. The converter-normalizer 510 may further normalize the source data, so that the application model may recognize that the daily recommended intake of 15 mcg of Vitamin D is substantially equivalent to about 600 IU of Vitamin D.

The data processor 520 is configured to receive the converted and normalized source data from the converter-normalizer 510 and prepare the converted and normalized source data for use by the business rule applicator 530. The data processor 520 formats the converted and normalized source data in the form of meta data and technical data. For example, the data processor 520 may parse and categorize the source technical data into a plurality of categories that may be used by the business rule applicator 530, as well as the CS 100 (shown in FIG. 1), including, for example: height data, weight data, age data, percentage body fat data, gender data, race data, ethnicity data, nationality data, allergy data, disease data, medical condition data, medical history data, family history data, genetic data, and the like; foods data, nutrition data, ingredients data, drug data (prescription or non-prescription), herbs data, food supplements data, drink data, occupation data, education data, lifestyle data (for example, physical activity data, smoking data, alcohol consumption data, or the like), and the like; nutrient interaction data, drug interaction data, ingredient interaction data, nutrient-drug interaction data, food-nutrient-drug interaction data, food-nutrient-allergy interaction data, and the like; and the like. The data processor 520 may merge and compare the source data received from the various data sources 190, depending on the requests made from the CE 105. The data processor 520 may ensure that The business rule applicator 530 is configured to receive the processed source data from the data processor 520, carry out validations, and filter the processed source data based on rules associated with one or more calling processes. When a request is made by the CE 105 for a certain table in the RDA 190-3 and the FDA 190-2, the business rule applicator 530 ensures that the correct source data is received and processed by the CE 105. For example, based on a demographic data, a drug data, and a condition state data received from a particular user, the business rule applicator 530 may ensure that only source data that is relevant to the particular demographic data, drug data and condition state data is received from the various data sources 190 and processed by the CE 105. The business rule applicator 530 may ensure that CE 105 receives and process source data that it needs to fully process a profile for the particular user.

The data output by the business rule applicator 530 may include information that is relevant to the one or more calling processes. The calling processes may include, for example: a process for identifying and determining a drug impact; a process for identifying and determining a drug interaction; a process for identifying and determining a nutrient or ingredient impact; a process for identifying and determining a nutrient or ingredient interaction, an allergy impact, and the like.

For example, while all source data may be available to a process for identifying and determining a drug impact, only the nutrient information may be pertinent to a process for identifying and determining a drug—nutrient interaction. Accordingly, the business rule applicator 530 may exclude, for example, irrelevant drug impact source data from the processed source data supplied to a module in the CS 100 tasked with identifying and determining a drug—nutrient interaction, such as, for example, the Food-Nutrient-Drug processor 320 in co-pending U.S. patent application Ser. No. 12/732,441, filed May 18, 2010. The business rule applicator 530 may similarly filter the source data to provide relevant information to the other calling processes, including, for example, processes for identifying and determining a nutrient or ingredient impact or interaction, an allergy impact, and the like.

The business rule applicator 530 may include artificial intelligence (AI), including, for example, fuzzy logic, neural networks, genetic algorithms, and the like. The AI may be configured to learn and adapt weighting rules based on historical data and/or direct training by an expert through, for example, a human-machine-interface (HMI), or the like.

The filtered source data may then be output by the TE 500 to the PE 120 and/or WE 130 (shown in FIG. 1). The PE 120 and/or WE 130 may receive the filtered source data from the TE 500 and filter product and/or service offerings to fit the user information for each of the users 170 (shown in FIG. 1). The product and/or service offerings may include, for example, a recipe, a diet plan, a menu plan, a prepared meal (for example, from an internal and/or external partner), exercise programs (or plans), exercise equipment, and the like.

Figure 6:
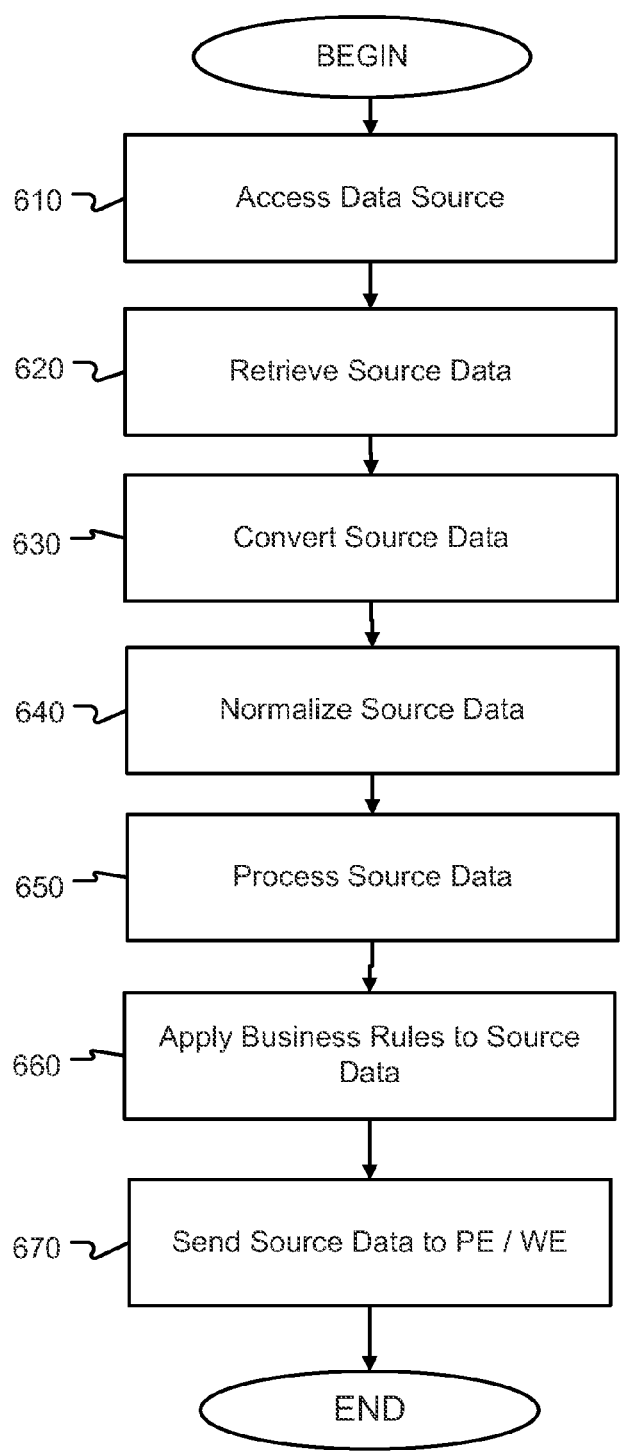
FIG. 6 shows an example of a process for retrieving source data from a plurality of disparate data sources and providing consistent, mapped, and correlated data.

FIG. 6 shows an example of a process for retrieving source data from a plurality of disparate data sources and providing consistent, mapped, and correlated data.

Referring to FIGS. 1 and 6, the transformation engine (TE) 100 accesses a plurality of disparate data sources (for example, databases 190) via a network 150 (Step 610). The TE 100 may retrieve source data from one or more of the plurality of data sources (Step 620). The retrieved source data may include one or more data elements related, but not limited to, for example, foods, nutrition, drugs, herbs, supplements, diseases, medical conditions, genetics, allergies, gender, race, ethnicity, nationality, age, height, weight, percentage body fat, lifestyles, occupations, education, and the like. The data elements may include, for example, an identifier (for example, a name, a number, or the like), a quantity (for example, a mass, a weight, a time, a volume, or the like), and the like. For instance, a data element may include a nutrient name, a recommended daily intake of the nutrient, a name of another nutrient, ingredient, drug, food, supplement, herb, or the like, that may interact with the nutrient, and the like. Each retrieved source data may include a plurality of data elements.

The TE 100 may apply one or more conversion algorithms to the source data to ensure that the transformed data fits a predetermined application model (Step 630). For instance, source data from RDA database(s) 190-3 may provide a caloric intake given a certain range (for example, height range, weight range, age range, or the like) in international units (IU's), and the FDA database(s) 190-2 may provide total amounts of intake given a certain drug in microgram mass units (μg). The TE 100 may analyze both sets of source data and format the source data in a manner that the application model may recognize the two elements as being substantially equivalent.

The TE 100 may apply one or more normalization algorithms to ensure source data consistency through the process (Step 640). For instance, the source data received from the USDA database(s) 190-1 may provide an ingredient or nutrient quantity and spell the name of the ingredient (for example, "Vitamin D") or nutrient quantities differently than, for example, the source data provided by the RDA database(s) 190-3 for the same ingredient (for example, "Vit. D") or nutrient quantities. The TE 100 may analyze both sets of source data and format the data in a manner that the application model may recognize the ingredient or nutrient quantities as being substantially equivalent.

The TE 100 may next process the converted and normalized source data and prepare the converted and normalized source data for application of one or more business rules (Step 650). For example, the TE 100 may parse and categorize the source data into a plurality of categories to which the business rules may be applied.

After the converted and normalized source data has been processed, the TE 100 may apply one or more business rules (Step 660). The TE may also carry out validations, and filter the processed source data based on rules associated with one or more calling processes. The calling processes may include, for example: a process for identifying and determining a drug impact; a process for identifying and determining a drug interaction; a process for identifying and determining a nutrient or ingredient impact; a process for identifying and determining a nutrient or ingredient interaction, an allergy impact, and the like.

For example, while all source data may be available to a process for identifying and determining a drug impact, only the nutrient information may be pertinent to a process for identifying and determining a drug—nutrient interaction. Accordingly, the TE 100 may exclude, for example, irrelevant drag impact source data from the processed source data supplied to a module in the CS 100 tasked with identifying and determining a drug—nutrient interaction.

The filtered source data may then be sent from TE 100 to the PE 120 and/or WE 130 (Step 670), where a used profile may be generated and/or updated.

According to a further aspect of the disclosure, a computer program may be provided embodied in a computer readable medium, which when executed on a computer in the TE 110 (or CE 105) may cause Steps 610 through 670 to be carried out. The computer readable medium may include a code section (or segment) associated with each of the Steps 610 through 670.

Although the disclosure has been provided with reference to several embodiments, it is understood that the words that have been used are words of description and illustration, rather than words of limitation. Changes may be made within the purview of the appended claims, as presently stated, without departing from the scope or spirit of the disclosure in its aspects. Although the disclosure has been described with reference to particular means, materials and embodiments, the disclosure is not limited to the particulars disclosed; rather, the disclosure extends to all functionally equivalent structures, methods, and uses such as are within the scope of the appended claims. These examples are merely illustrative and are not meant to be an exhaustive list of all possible designs, embodiments, applications or modifications of the disclosure.

In accordance with various embodiments of the present disclosure, the methods described herein are intended for operation as software programs running on a computer. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

While the present specification describes components and functions implemented in the embodiments with reference to particular standards and protocols, the disclosure is not limited to such standards and protocols. Accordingly, replacement standards and protocols having the same functions are considered equivalent.

What is claimed:

1. A computer comprising a transformation engine that retrieves source data from a plurality of disparate data sources and provides source data that is consistent and normalized, the transformation engine comprising:
    a plurality of interfaces that receive source data from a plurality of disparate databases, the source data comprising a plurality of data elements;
    an aggregator that aggregates the received source data to create aggregated source data;
    a converter-normalizer that applies a normalization algorithm to at least a portion of the aggregated source data to create normalized source data;
    a data processor that categorizes the normalized source data into a plurality of data categories;
    a business rule applicator that applies one or more business rules to the plurality of data categories to identify pertinent data; and,
    a model generator that generates an application model based at least in part on the identified pertinent data.

2. The computer comprising the transformation engine of claim 1, further comprising:
    a converter-normalizer that analyzes a first source data and a second source data in the received source data and formats the first source data or the second source data so that a quantity of a first data element in the plurality of data elements is determined to be equivalent to a quantity of a second data element.

3. The computer comprising the transformation engine of claim 1, wherein the data processor is configured to receive a first source data and a second source data and format the first source data or the second source data in accordance with an input format of the business rule applicator.

4. The computer comprising the transformation engine of claim 1, wherein the plurality of interfaces comprise an application program interface.

5. The computer comprising the transformation engine of claim 1, wherein plurality of interfaces comprise an open database connectivity.

6. The computer comprising the transformation engine of claim 1, wherein plurality of interfaces comprise an input-output-interface.

7. The computer comprising the transformation engine of claim 4, wherein the application program interface is executed by the computer to access at least one of:
    a USDA database;
    an FDA database;
    a PDR database;
    an ADA database;

an MDM database;
an IM database;
an RDA/RDI database;
a REF database; and
an RMMS database.

8. The computer comprising the transformation engine of claim 1, wherein the business rule applicator identifies pertinent data based at least in part on the input requirements of at least one of: a nutrient caloric intake processor; a drug interaction processor; and a nutrient impact processor.

9. The computer comprising a condition engine that includes the transformation engine of claim 1.

10. A method for transforming source data that is received from a plurality of disparate data sources to source data that is consistent, mapped and correlated, the method comprising:
   receiving, at a plurality of interfaces, the source data from the plurality of disparate data sources, the source data comprising a first data element and a second data element;
   converting and normalizing the received source data from the plurality of disparate data sources so that the first data element and the second data element are recognizable as being equivalent;
   parsing the converted and normalized source data;
   categorizing the parsed source data; and
   applying a business rule to the categorized source data to identify pertinent data; and,
   generating an application model based at least in part on the identified pertinent data.

11. The method of claim 10, further comprising:
   analyzing the received source data; and
   formatting the received source data so that a quantity of the first data element is determined to be equivalent to a quantity of a third data element.

12. The method of claim 10, wherein the parsing the converted and normalized source data and the categorizing the parsed source data are performed in accordance with an input format of a business rule applicator.

13. The method of claim 10, wherein pertinent data is identified based at least in part on input requirements of at least one of:
   a nutrient caloric intake processor;
   a drug interaction processor; and
   a nutrient impact processor.

14. A computer comprising a transformation engine, comprising:
   a plurality of interfaces, each of which is configured to receive source data from at least of a plurality of disparate databases, the source data comprising a first data element and a second data element;
   a converter-normalizer configured to convert and normalize source data received from the plurality of disparate databases so that the first data element and the second data element are recognizable as being equivalent;
   a data processor configured to categorize the normalized data into a plurality of data categories;
   a business rule applicator that applies one or more business rules to the plurality of data categories to identify pertinent data; and,
   a model generator that generates an application model based at least in part on the identified pertinent data.

15. The computer comprising the transformation engine of claim 14, further comprising:
   a converter-normalizer configured to analyze and format a quantity of the first data element and a quantity of a third data element as being equivalent.

16. The computer comprising the transformation engine of claim 14, wherein the data processor is further configured to receive the normalized data and format the normalized data in accordance with an input format of the business rule applicator.

17. The computer comprising the transformation engine of claim 14, wherein the plurality of interfaces comprise an application program interface.

18. The computer comprising the transformation engine of claim 14, wherein the plurality of interfaces comprise an open database connectivity.

19. The computer comprising the transformation engine of claim 14, wherein the plurality of interfaces comprise an input-output-interface.

20. The computer comprising the transformation engine of claim 17, wherein the application program interface is executed by the computer to access at least one of:
   a USDA database;
   an FDA database;
   a PDR database;
   an ADA database;
   an MDM database;
   an IM database;
   an RDA/RDI database;
   a REF database; and
   an RMMS database.

* * * * *